United States Patent [19]
Wada et al.

[11] Patent Number: 5,364,173
[45] Date of Patent: Nov. 15, 1994

[54] PRESSURE SOURCE FOR PRESSURE DEVICE

[75] Inventors: Masayoshi Wada; Shohei Matsuda; Toshio Yahagi; Shinichi Inagawa, all of Saitama, Japan

[73] Assignee: Honda Giken Kogyo Kabushiki Kaisha, Tokyo, Japan

[21] Appl. No.: 201,713

[22] Filed: Feb. 25, 1994

Related U.S. Application Data

[63] Continuation of Ser. No. 817,490, Jan. 7, 1992, abandoned.

[30] Foreign Application Priority Data

Jan. 9, 1991 [JP] Japan ................... 3-001107

[51] Int. Cl.$^5$ ............................ B60T 8/40; B60T 8/94
[52] U.S. Cl. ........................................ 303/11; 303/92; 303/DIG. 3
[58] Field of Search .......... 303/10, 11, 3, 15, DIG. 1, 303/DIG. 2, DIG. 3, DIG. 4, 92

[56] References Cited

U.S. PATENT DOCUMENTS

| | | | |
|---|---|---|---|
| 3,402,972 | 9/1968 | Cooper et al. | 303/DIG. 3 |
| 4,402,554 | 9/1983 | Belart . | |
| 4,699,435 | 10/1987 | Wupper | 303/65 |
| 4,753,492 | 6/1988 | Leiber et al. | 303/DIG. 3 |
| 4,802,710 | 2/1989 | Burgdorf et al. | 303/11 |
| 4,848,847 | 7/1989 | Reinartz et al. | 303/DIG. 3 |
| 5,000,520 | 3/1991 | Schmitt | 303/DIG. 3 |
| 5,161,862 | 11/1992 | Kunz et al. | 303/11 |

FOREIGN PATENT DOCUMENTS

| | | |
|---|---|---|
| 0305950A1 | 3/1989 | European Pat. Off. . |
| 3833473A1 | 4/1990 | Germany . |
| 3836082A1 | 4/1990 | Germany . |
| 3813174A1 | 11/1990 | Germany . |
| 2168107A | 6/1986 | United Kingdom . |

Primary Examiner—Matthew C. Graham
Attorney, Agent, or Firm—Armstrong, Westerman, Hattori, McLeland & Naughton

[57] ABSTRACT

A pressure source for a pressure device includes a pump for pumping fluid from fluid tank, an accumulator connected to the pump and a pressure device, a device for detecting the pressure in the accumulator, and a controller for controlling the operation of the pump in an ON-OFF manner on the basis of a result of detection by the pressure detecting device. In this pressure source, the controller includes first and second drive signal generating circuits each capable of independently generating a drive signal for determining the on-off operation of the pump, and a judging circuit which has a calculating function therein and to which at least the pressure detecting device is connected. The judging circuit is connected to the first drive signal generating circuit, and the pressure detecting device is connected to the second drive signal generating circuit. This ensures that the control of the first drive signal generating circuit can be carried out at any time by a calculation in the judging circuit, leading to an increased function. When the judging circuit is in trouble, the on-off control of the pump can be carried out by the second drive signal generating circuit.

10 Claims, 9 Drawing Sheets

PRESSURE SOURCE FOR PRESSURE DEVICE

This application is a continuation of application Ser. No. 07/817,490 filed Jan. 7, 1992, now abandoned.

BACKGROUND OF THE INVENTION

1. Field of the Invention

This invention generally relates to a pressure source for a pressure device comprising a pump for pumping fluid from a fluid tank, an accumulator connected to the pump and to the pressure device, a pressure detecting means for detecting the pressure in the accumulator, and a controller for controlling the operation of the pump in an ON-OFF manner on the basis of a result of detection by the pressure detecting means.

2. Description of the Prior Art

Such a pressure source for a pressure device is conventionally used in a hydraulic braking pressure controlling device disclosed, for example, in Japanese Patent Application Laid-open No. 279449/90, and there are two types of such prior art pressure source which control the operation of the pump in an ON-OFF manner. One of them (a) is to control the operation of the pump on the basis of a detection value provided by a single pressure detecting means for detecting the pressure in the accumulator, and the other type (b) is to control the operation of the pump on the basis of results of calculation of a detection value provided by the pressure detecting means, an electric current value of a motor, a wheel speed and the like in a processing circuit including a microcomputer.

However, the prior art pressure source of the type (a) does not have a function to emit an alarm when a trouble occurs, nor a function to stop the operation of the system in response to the trouble and hence, such prior art pressure source is not functionally satisfactory. Further, in the prior art pressure source of the type (b), a trouble may occur in the processing circuit and hence, it is necessary to provide a proper back-up measure. Moreover, in both the pressure sources of the types (a) and (b), the pressure detecting means is single and therefore, it is necessary to further provide a measure for the case when the pressure detecting means breaks down.

SUMMARY OF THE INVENTION

Accordingly, it is an object of the present invention to provide a pressure source for a pressure device, wherein the above problems are overcome.

To achieve the above object, according to the present invention, there is provided a pressure source for a pressure device, comprising a pump for pumping fluid from a fluid tank, an accumulator connected to the pump and a pressure device, a pressure detecting means for detecting the pressure in the accumulator, and a controller for controlling the operation of the pump in an ON-OFF manner on the basis of a result of detection by the pressure detecting means, wherein the controller includes first and second drive signal generating circuits each capable of independently generating a drive signal for determining the ON-OFF operation of the pump, and a processing circuit which has a calculating function therein and to which at least the pressure detecting means is connected, the processing circuit being connected to the first drive signal generating circuit, and the pressure detecting means being connected to the second drive signal generating circuit. Therefore, the control of the first drive signal generating circuit can arbitrarily be carried out by a calculation in the processing circuit, leading to an enlarged function. When the processing circuit is in trouble, the on-off control of the pump can be carried out by the second drive signal generating circuit.

According to another aspect of the present invention, there is provided a pressure source for a pressure device, comprising a pump for pumping fluid from a fluid tank, an accumulator connected to the pump and a pressure device, a pressure detecting means for detecting the pressure in the accumulator, and a controller for controlling the operation of the pump in an ON-OFF manner on the basis of a result of detection by the pressure detecting means, wherein the pressure detecting means comprises a first pressure detector capable of detecting a first low pressure and a first high pressure higher than the first low pressure, and a second pressure detector capable of detecting a second low pressure lower than the first low pressure and a second high pressure higher than the second low pressure, and the controller includes first and second drive signal generating circuits each capable of independently generating a drive signal for determining the ON-OFF operation of the pump, the first pressure detector being connected to the first drive signal generating circuit, and the second pressure detector being connected to the second drive signal generating circuit. Therefore, when both the pressure detectors or one of both the drive signal generating circuits are out of order, the operation of the pump can be controlled by the other.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 3 illustrate a first embodiment of the present invention, wherein

FIG. 1 is a diagram of the entire hydraulic circuit;

FIG. 2 is a circuit diagram illustrating an arrangement of a controller; and

FIG. 3 is a diagram illustrating a pressure detecting range of a pressure detector;

DESCRIPTION OF THE PREFERRED EMBODIMENTS

The present invention will now be described by way of embodiments applied to a pressure source for a brake device in an automobile in connection with the accompanying drawings.

Figure 1:
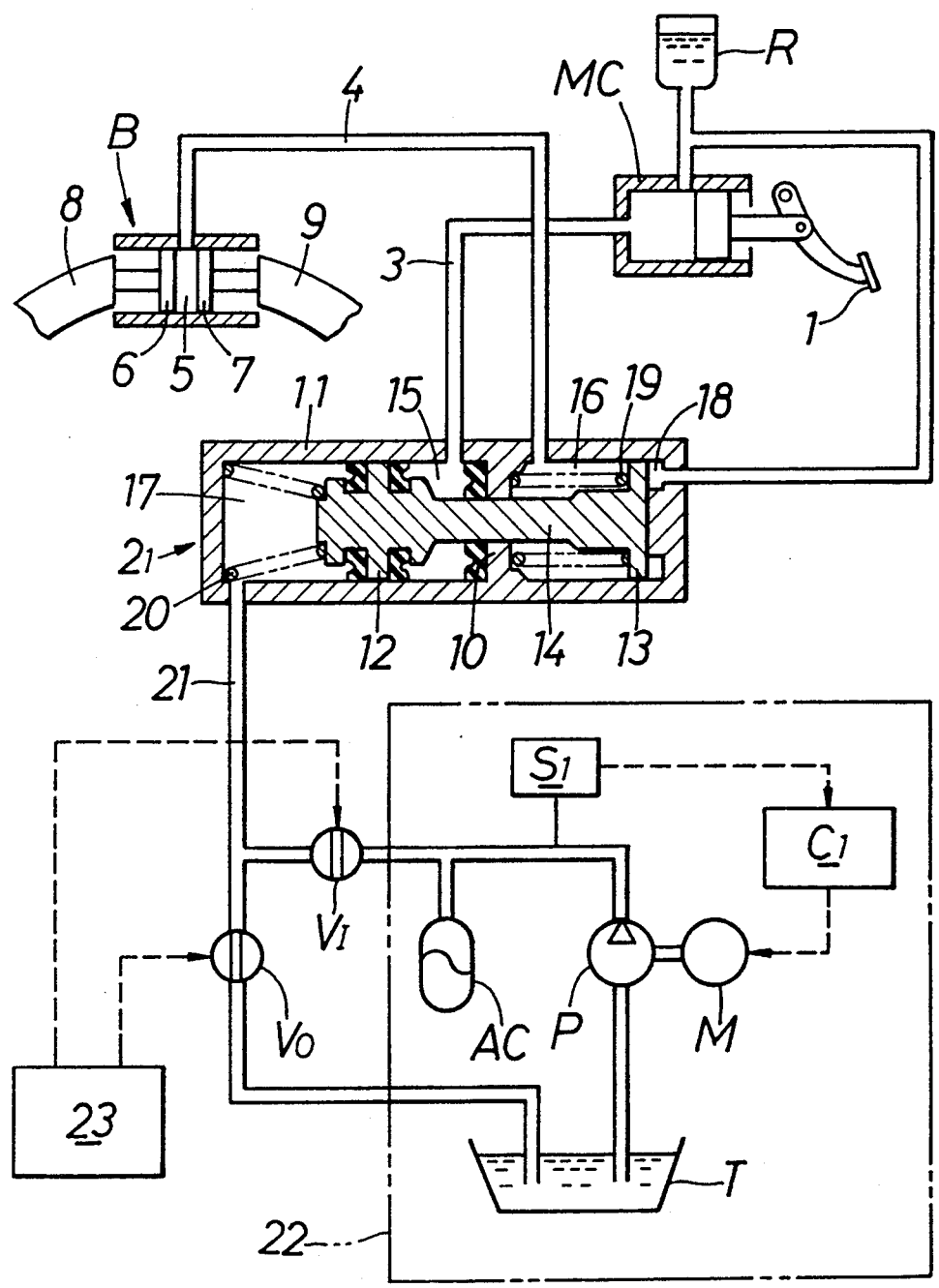

Referring first to FIG. 1, a brake pedal 1 is operatively connected to a master cylinder MC, and an output hydraulic pressure from the master cylinder MC is transmitted to a wheel brake B via an adjusting device $2_1$ as a pressure device.

In the wheel brake B, an oil passage 4 is connected to a braking oil chamber 5, so that the supply of hydraulic pressure through the oil passage 4 to the braking oil chamber 5 causes pistons 6 and 7 to be moved away from each other, moving brake shoes 8 and 9 into frictional contact with a brake drum (not shown) to generate braking torque.

If the hydraulic braking pressure in the braking oil chamber 5 is too large, the braking torque generated between each of the brake shoes 8 and 9 and the brake drum is too large, and as a result, a wheel becomes locked. Therefore, if the wheel is about to become locked, the hydraulic braking pressure is reduced by the adjusting device $2_1$, thereby preventing the wheel from becoming locked.

The adjusting device $2_1$ includes a cylinder 11 occluded at its opposite ends and partitioned at its intermediate portion by a partition wall 10, and a rod 14 having pistons 12 and 13 respectively at its opposite ends and having a portion between the pistons 12 and 13 which is axially slidably passed through the partition wall 10. A primary hydraulic braking pressure chamber 15 defined between the partition wall 10 and the piston 12 is connected via the oil passage 3 to the master cylinder MC. A secondary hydraulic braking pressure chamber 16 defined between the partition wall 10 and the piston 13 is connected via the oil passage 4 to the braking oil chamber 5. An anti-lock control hydraulic pressure chamber 17 is defined between one of end walls of the cylinder 11 and the piston 12, while a releasing oil chamber 18 is defined between the other end wall of the cylinder 11 and the piston 13 and connected to a reservoir R for the master cylinder MC. A spring 19 is accommodated in the secondary hydraulic braking pressure chamber 16 for biasing the piston 13 away from the partition wall 10, while a spring 20 is accommodated in the anti-lock control hydraulic pressure chamber 17 for biasing the piston 12 toward the partition wall 10.

An oil passage 21 is connected to the anti-lock control hydraulic pressure chamber 17 and also connected to a pressure source 22 through a normally-closed type inlet valve $V_I$ and to an oil tank T as a fluid tank through a normally-opened outlet valve $V_o$.

The inlet valve $V_I$ and the outlet valve $V_o$ are solenoid valves, and the opening and closing thereof are controlled by an anti-lock control processor 23 comprising a microcomputer.

With the inlet valve $V_I$ closed and the outlet valve $V_o$ opened, the anti-lock control hydraulic pressure chamber 17 is opened to the oil tank T. If the brake pedal 1 is depressed down to permit hydraulic pressure from the master cylinder MC to be supplied into the primary hydraulic braking pressure chamber 15, the volume of the secondary hydraulic braking pressure chamber 16 is decreased, so that hydraulic braking pressure of a level corresponding to the hydraulic pressure from the master cylinder MC is supplied to the braking oil chamber 5 in the wheel brake B. Thus, the torque during braking is freely increased in accordance with the braking operation by an operator.

If the inlet valve $V_I$ is opened and the outlet valve $V_o$ is closed, anti-lock control hydraulic pressure is supplied to the anti-lock control hydraulic pressure chamber 17 and hence, notwithstanding that the hydraulic pressure from the master cylinder MC is applied to the primary hydraulic braking pressure chamber 15, the volume of the secondary hydraulic braking pressure chamber 16 is increased, and the hydraulic pressure in the braking oil chamber 5 in the wheel brake B is reduced and thus, the braking torque is reduced. Therefore, when the wheel is about to enter a locked state, the wheel can be prevented from entering the locked state by opening the inlet valve $V_I$ and closing the outlet valve $V_o$.

The pressure source 22 includes a pump P for pumping working oil as working fluid from the oil tank T, an accumulator AC connected to the pump P and the adjusting device $2_1$, a single pressure detector $S_1$ as a pressure detecting means for detecting the pressure in the accumulator AC, and a controller $C_1$ for controlling the operation of the pump P in an ON-OFF manner in accordance with the result of detection by the pressure detector $S_1$. A DC (direct current) motor M is connected to the pump P, and the controller $C_1$ controls the operation of the motor M in an ON-OFF manner.

Figure 2:
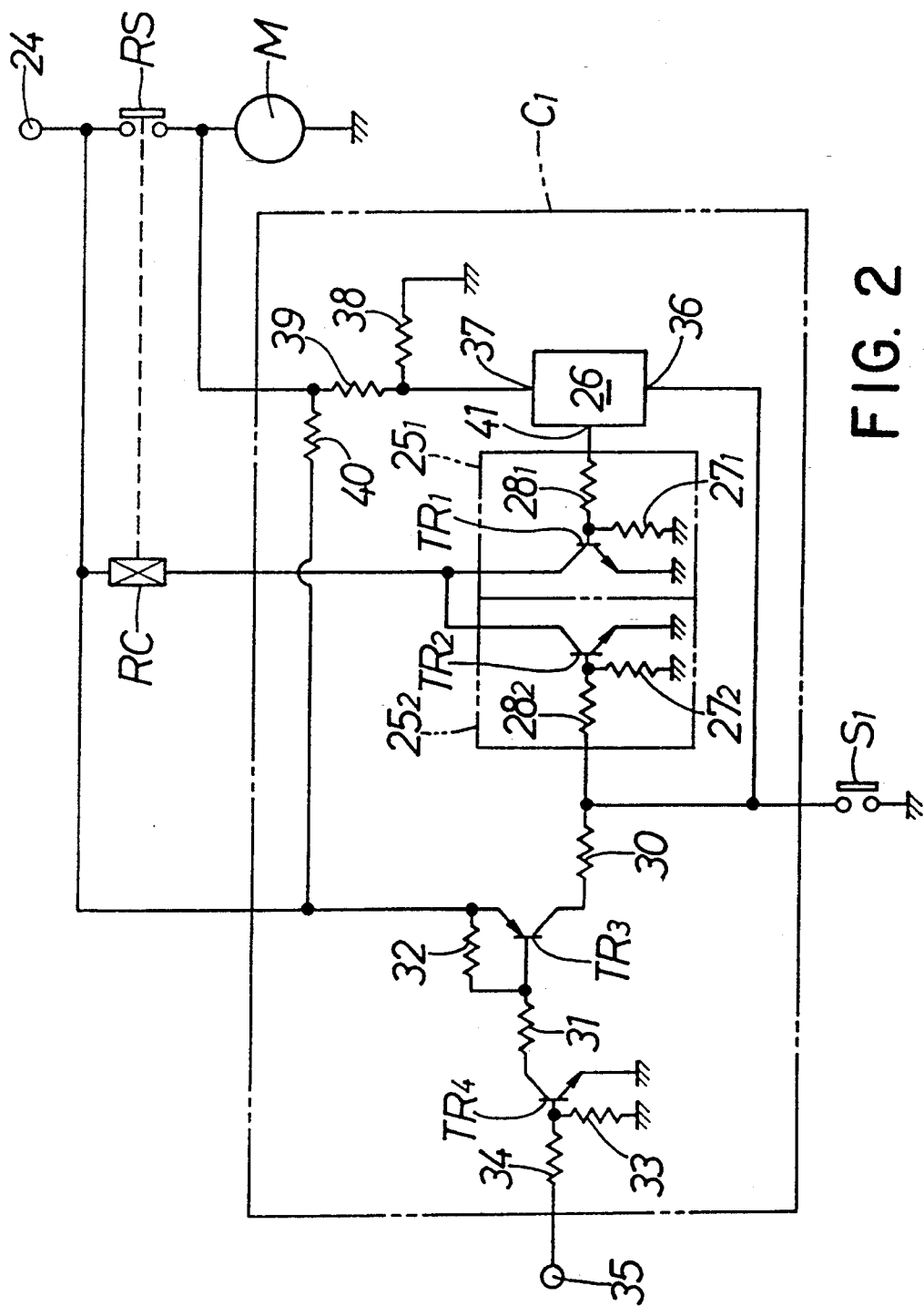

Referring to FIG. 2, a terminal 24, to which a vehicle battery is connected, is connected to the motor M through a relay switch RS which is shiftable between an ON state corresponding to an energization of a relay coil RC and an OFF state corresponding to a deenergization of the relay coil RC. The energization and deenergization of the relay coil RC, i.e., the turning ON and OFF of the relay switch RS are controlled by the controller $C_1$.

The controller $C_1$ includes a first drive signal generating circuit $25_1$ and a second drive signal generating circuit $25_2$ connected in parallel with each other to the relay coil RC, and a processing circuit 26 which is comprised of a microcomputer for providing a calculating function and to which the pressure detector $S_1$ is connected. The processing circuit 26 is connected to the first drive signal generating circuit $25_1$, and the pressure detector $S_1$ is connected to the second drive signal generating circuit $25_2$.

The first drive signal generating circuit $25_1$ includes an NPN transistor $TR_1$ connected in series to the relay coil RC, a resistor $27_1$ connected between a base of the transistor $TR_1$ and the earth, and a resistor $28_1$ connected to the base of the transistor $TR_1$. The second drive signal generating circuit $25_2$ includes an NPN transistor $TR_2$ connected to the relay coil RC in parallel to the transistor $TR_1$, a resistor $27_2$ connected between a base of the transistor $TR_2$ and the earth, and a resistor $28_2$ connected to the base of the transistor $TR_2$.

Figure 3:
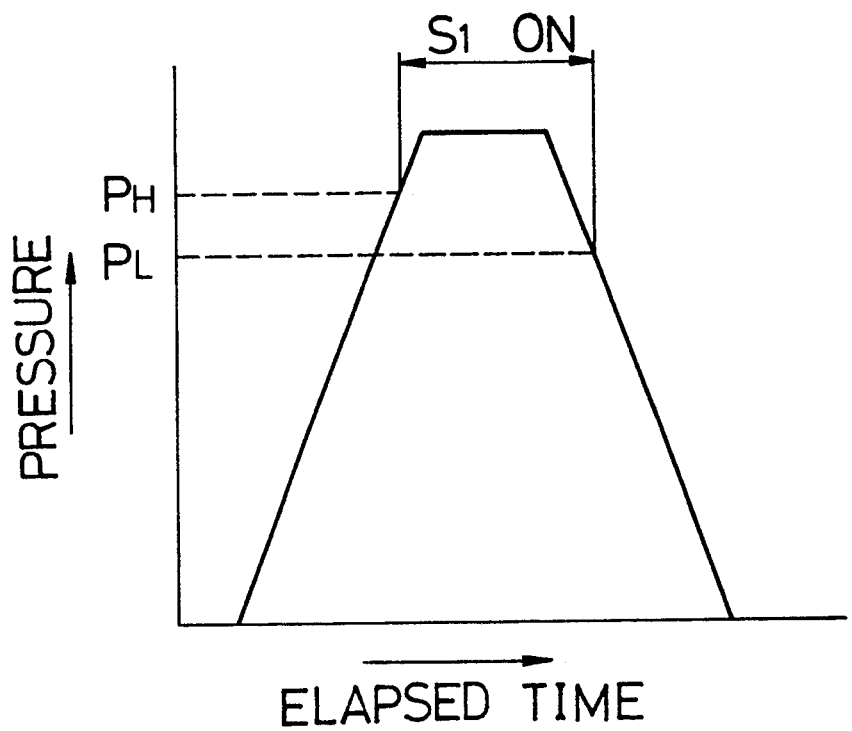

The pressure detector $S_1$ is a switch which is adapted to be turned ON when the pressure in the accumulator AC exceeds a preset high pressure $P_H$ in the course of increasing in the pressure, and to be turned OFF in response to the pressure in the accumulator AC becoming equal to or less than a preset low pressure $P_L$ which is predetermined at a lower level than the present high pressure $P_H$ in the course of reduction in the pressure, as shown in FIG. 3. The provision of a hysteresis to the detection value detected by the pressure detector $S_1$ in this manner makes it possible to avoid a hunting produced in a control of the pressure in the accumulator AC. Alternatively, in place of provision of the hysteresis to the detection value detected in the pressure detector $S_1$, a delay may be provided in the time of a calculation processing in the processing circuit 26 on the basis of the detection signal from the pressure detector $S_1$.

The pressure detector $S_1$ is connected to the terminal 24 through a resistor 30 and a PNP transistor $TR_3$. A base of the transistor $TR_3$ is grounded through a resistor 31 and an NPN transistor $TR_4$, and the base and an emitter of the transistor $TR_3$ are connected to each other through a resistor 32. A base of the transistor $TR_4$ is grounded through a resistor 33 and connected to an input terminal 35 through a resistor 34. The input terminal 35 is connected to an ignition key (not shown). Thus, when the ignition key is turned ON, the transistor $TR_3$ is also brought into conduction in response to the conduction of the transistor $TR_4$ and hence, the pressure detector $S_1$ is brought into conduction to the terminal 24.

A point between the pressure detector $S_1$ and the resistor 30 is connected to a first input terminal 36 of the processing circuit 26 and also to the base of the transistor $TR_2$ in the second drive signal generating circuit $25_2$ through the resistor $28_2$. A second input terminal 37 of the processing circuit 26 is grounded through a resistor 38 and connected to the terminal 24 through resistors 39 and 40. Further, a line between the resistors 39 and 40 is connected between the relay switch RS and the motor M. Thus, when the pressure detector $S_1$ is turned OFF, a high level signal is applied to the first input terminal 36. When the relay switch RS is turned on to operate the motor M, a high level signal is applied to the second input terminal 37. The processing circuit 26 carries out the calculation of the signals received from the first and second input terminals 36 and 37. Moreover, an output terminal 41 of the processing circuit 26 is connected to the base of the transistor $TR_1$ in the first drive signal generating circuit $25_1$ through the resistor $28_1$, and the processing circuit 26 produces a signal indicative of a command to control the first drive signal generating circuit $25_1$ from the output terminal 41 on the basis of the result of the calculation of the processing circuit 26.

The operation of the first embodiment will be described below. The first drive signal generating circuit $25_1$ in the controller $C_1$ is controlled by the processing circuit 26 having a calculating function. The processing circuit 26 can control the first drive signal generating circuit $25_1$ to control the operation of the motor M and hence the pump P in accordance with the result provided according to a program having a processing operation which has been preset therein such as correcting the detection signal from the pressure detector $S_1$ corresponding to a pressure accumulated condition in the accumulator AC in response to another signal (not shown), e.g., a vehicle speed signal. Therefore, it is possible to carry out a control having an enlarged function, as compared with a control directly adapted to a valve detected by the pressure detector $S_1$.

Moreover, if the pressure detector $S_1$ is turned OFF as the pressure accumulated in the accumulator AC becomes equal to or less than the preset low pressure $P_L$, the transistor $TR_2$ in the second drive signal generating circuit $25_2$ conducts to energize the relay coil RC, and the relay switch RS is turned ON, thereby starting the operation of the motor M, i.e., the discharging operation of the pump P. If the pressure detector $S_1$ is turned ON as the pressure in the accumulator AC exceeds the preset high pressure $P_H$, the transistor $TR_2$ is cut off to deenergize the relay switch RC, thereby stopping the operation of the motor M, i.e., the pump P. Therefore, even if the processing circuit 26 breaks down, it is possible to control the operation of the motor M, i.e., the pump P by a back-up by the second drive signal generating circuit $25_2$, leading to an enhanced safety.

A signal indicative of whether or not the motor M is in operation is applied to the second input terminal 37 of the processing circuit 26, and hence, when the motor M is not in operation, notwithstanding that the motor M should be operated, the processing circuit 26 can judge that there is any problem in the pressure detector $S_1$, the motor M or the pump P. If there is such a problem then an alarm can be delivered from the processing circuit 26 or the operation of the system can be stopped, and this also makes it possible to enlarge the function.

Further, when the ignition key of the engine mounted in the vehicle is OFF, it is unnecessary to control the operation of the motor M. In this case, the transistor $TR_3$ is in cut-off state by the turning-OFF of the ignition key, thereby preventing a wasteful consumption of power of the vehicle battery which is connected to the terminal 24.

Figure 4:
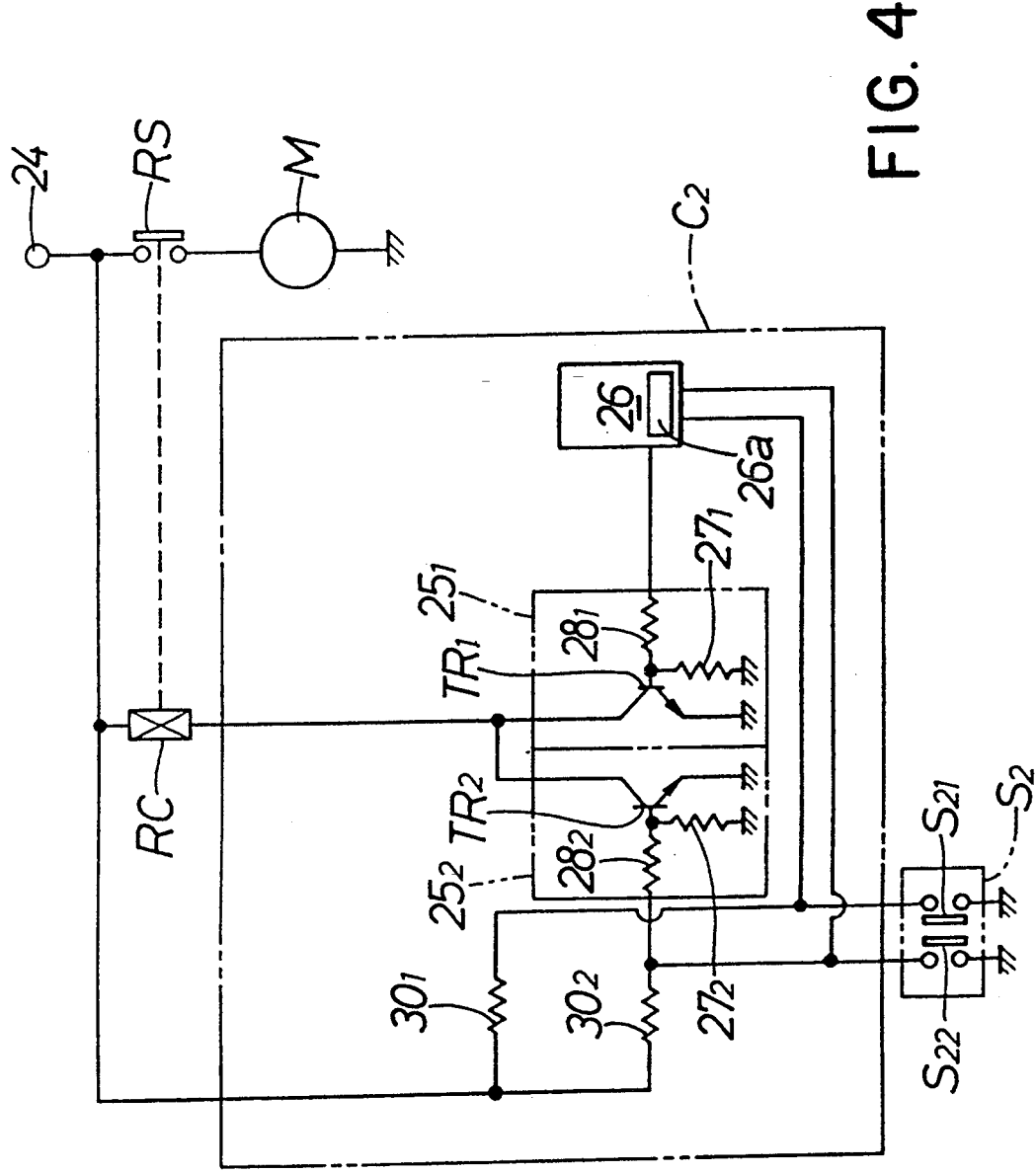
FIG. 4 is a circuit diagram similar to FIG. 2, but illustrating an arrangement of a controller according to a second embodiment of the present invention.
Figure 5:
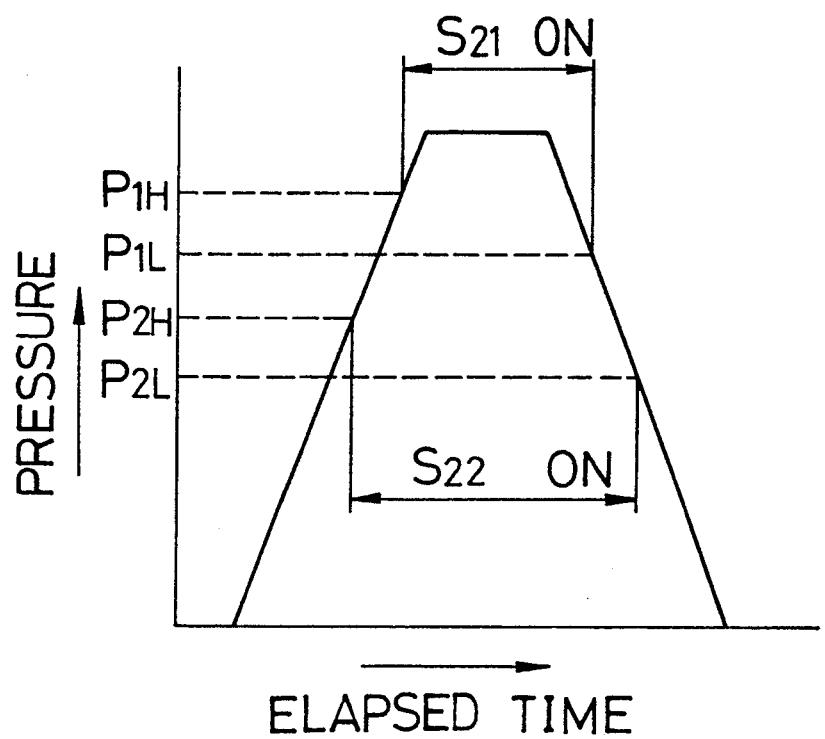
FIG. 5 is a diagram illustrating a pressure detecting range of the pressure detector shown in FIG. 4.

FIGS. 4 and 5 illustrate a second embodiment of the present invention, wherein components or parts corresponding to those in the previously-described first embodiment are designated by like reference characters.

A pressure detecting means $S_2$ includes a first pressure detector $S_{21}$ and a second pressure detector $S_{22}$. A first drive signal generating circuit $25_1$ in a controller $C_2$ is controlled by the processing circuit 26. The first and second pressure detectors $S_{21}$ and $S_{22}$ are connected to the processing circuit 26, and the second pressure detector $S_{22}$ is connected to a second drive signal generating circuit $25_2$ in the controller $C_2$.

The first pressure detector $S_{21}$ is a switch for detecting a controlling pressure, which is adapted to be turned ON when the pressure in the accumulator AC exceeds a first predetermined high pressure $P_{1H}$ in the course of increasing in the pressure, and to be turned OFF in response to the pressure in the accumulator AC becoming equal to or less than a first predetermined low pressure $P_{1L}$ lower than the first high pressure $P_{1H}$ in the course of reduction in the pressure, as shown in FIG. 4. The first high pressure $P_{1H}$ and the first low pressure $P_{1L}$ are set in a pressure range normally required for an anti-lock control in the adjusting device $2_1$ shown in FIG. 1. The second pressure detector $S_{22}$ is a switch for detecting an alarming pressure, which is adapted to be turned ON when the pressure in the accumulator AC exceeds a second high pressure $P_{2H}$ determined at a lower level than the first high pressure $P_{1H}$ in the course of increasing in the pressure, and to be turned OFF in response to the pressure in the accumulator AC becoming equal to or less than a second low pressure $P_{2L}$ determined at a lower level than the first low pressure $P_{1L}$ and the second high pressure $P_{2H}$ in the course of reduction in the pressure, as shown in FIG. 4. The second high pressure $P_{2H}$ and the second low pressure $P_{2L}$ are set in a minimum pressure range required for the anti-lock control in the adjusting device $2_1$.

Moreover, the first pressure detector $S_{21}$ is connected to the terminal 24 through a resistor $30_1$, and the processing circuit 26 is connected between the first pressure detector $S_{21}$ and the resistor $30_1$. The second pressure detector $S_{22}$ is connected to the terminal 24 through a resistor $30_2$. And the processing circuit 26 is connected between the second pressure detector $S_{22}$ and the resistor $30_2$. Further, the base of the transistor $TR_2$ is connected between the second pressure detector $S_{22}$ and the resistor $30_2$ through the resistor $28_2$.

The processing circuit 26 also includes a trouble deciding section 26a for the pressure detectors $S_{21}$ and $S_{22}$, and is arranged to control the first drive signal generating circuit $25_1$ on the basis of a detection value detected by the first pressure detector $S_{21}$, when the first pressure detector $S_{21}$ is normal, and to control the first drive signal generating circuit $25_1$ on the basis of a detection value detected by the second pressure detector $S_{22}$, when it has been judged that the first pressure detector $S_{21}$ is in trouble. The trouble deciding section 26a is arranged to judge a trouble by monitoring, in association, parameters dependent on which the output signal from the first pressure detector $S_{21}$ is assumed to be varied, e.g., an anti-lock control signal and a pump-driving signal, and output signals from the first and second pressure detector $S_{21}$ and $S_{22}$. For example, even if the anti-lock control signal is generated several times and when the first pressure detector $S_{21}$ cannot be turned OFF, it is possible for the trouble deciding section 26a to judge that the first pressure detector $S_{21}$ has been troubled while being kept ON. On the other hand, when the pump-driving signal is generated but the first pressure detector $S_{21}$ cannot be turned ON, it is possible for the trouble deciding section 26a to judge that the first pressure detector $S_{21}$ has been troubled while being kept OFF.

Further, the processing circuit 26 is arranged to stop the generation of the drive signal from the first drive signal generating circuit $25_1$ after lapse of a predetermined time from the detection of the first high pressure $P_{1H}$ by the first pressure detector $S_{21}$, when the processing circuit 26 has judged that the first pressure detector $S_{21}$ is normal. The predetermined time is set to be prolonged as the vehicle speed is increased.

According to the second embodiment, by inputting the detection signals of the pressure detectors $S_{21}$ and $S_{22}$ to the processing circuit 26, the circuit 26 can control the first drive signal generating circuit $25_1$ to control the operation of the motor M, i.e., the pump P on the basis of the detection signals from the pressure detectors $S_{21}$ and $S_{22}$ corresponding to the accumulated condition in the accumulator. Moreover, a proper pressure which is not excessive nor insufficient can be supplied to the pressure device, i.e., the adjusting device $2_1$ and a suspension device mounted in the vehicle which require a pressure energy increased with an increase in vehicle speed, because the processing circuit 26 stops the generation of the drive signal from the first pressure detector $S_{21}$ after lapse of the predetermined time from the detection of the first high pressure $P_{1H}$ by the first pressure detector $S_{21}$, when the circuit 26 has judged that the first pressure detector $S_{21}$ is normal, and the predetermined time is prolonged as the vehicle speed is increased.

Further, the processing circuit 26 can judge a trouble on the basis of the detection signals from the first and second pressure detectors $S_{21}$ and $S_{22}$. If the circuit 26 has judged that the first pressure detector $S_{21}$ is in trouble, a high pressure can be insured to the utmost in the accumulator AC by setting a predetermined delay time on the basis of the detection signal from the second pressure detector $S_{22}$ to control the first drive signal generating circuit $25_1$.

If the processing circuit 26 breaks down, then the second drive signal generating circuit $25_2$ is controlled on the basis of the detection signal from the second pressure detector $S_{22}$ and therefore, a minimum required pressure can be insured.

Figure 6:
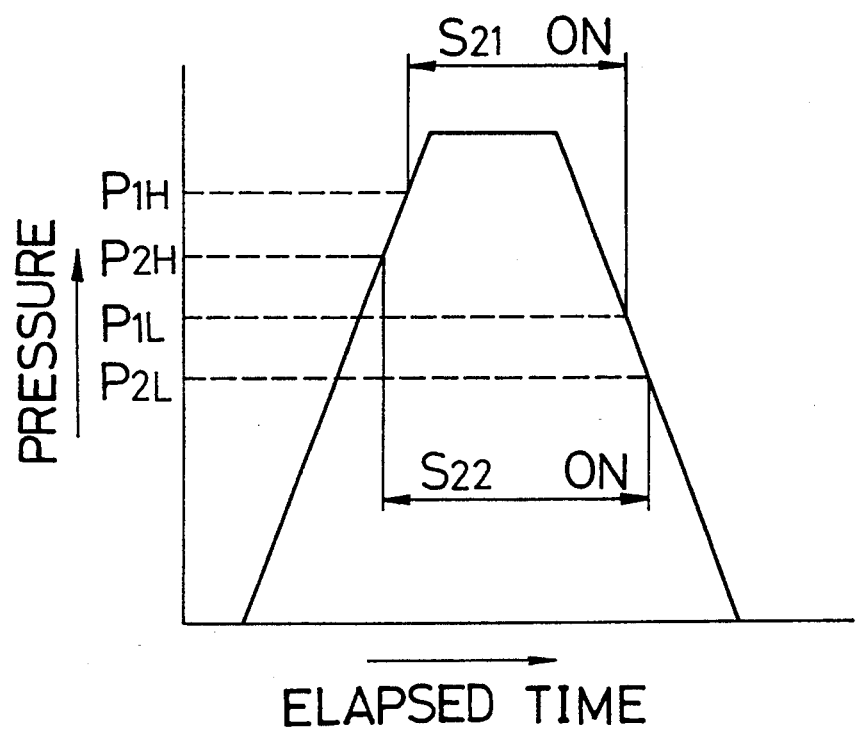
FIG. 6 is a diagram illustrating a modification of the pressure detecting range of the detector shown in FIG. 4.

FIG. 6 illustrates a modification of a pressure detecting range of each of the first and second pressure detectors $S_{21}$ and $S_{22}$ in FIG. 4. The first pressure detector $S_{21}$ for detecting the controlling pressure is adapted to be turned ON, when the pressure exceeds the first high pressure $P_{1H}$ in the course of the pressure increasing, and to be turned OFF in response to the pressure becoming equal to or less than the first low pressure $P_{1L}$ in the course of the pressure reduction. The second pressure detectors $S_{22}$ for detecting the alarming pressure is adapted to e turned ON, when the pressure in the accumulator AC exceeds the second high pressure $P_{2H}$ which is determined lower than the first high pressure $P_{1H}$ but higher than the first low pressure $P_{1L}$, and to be turned OFF in response to the pressure in the accumulator AC becoming equal to or less than the second low pressure $P_{2L}$ which is determined lower than the first low pressure $P_{1L}$ and the second high pressure $P_{2H}$.

Even if the pressure detecting ranges by the first and second pressure detectors $S_{21}$ and $S_{22}$ are set in this manner, an effect similar to that in the previous embodiment can be provided.

Figure 7:
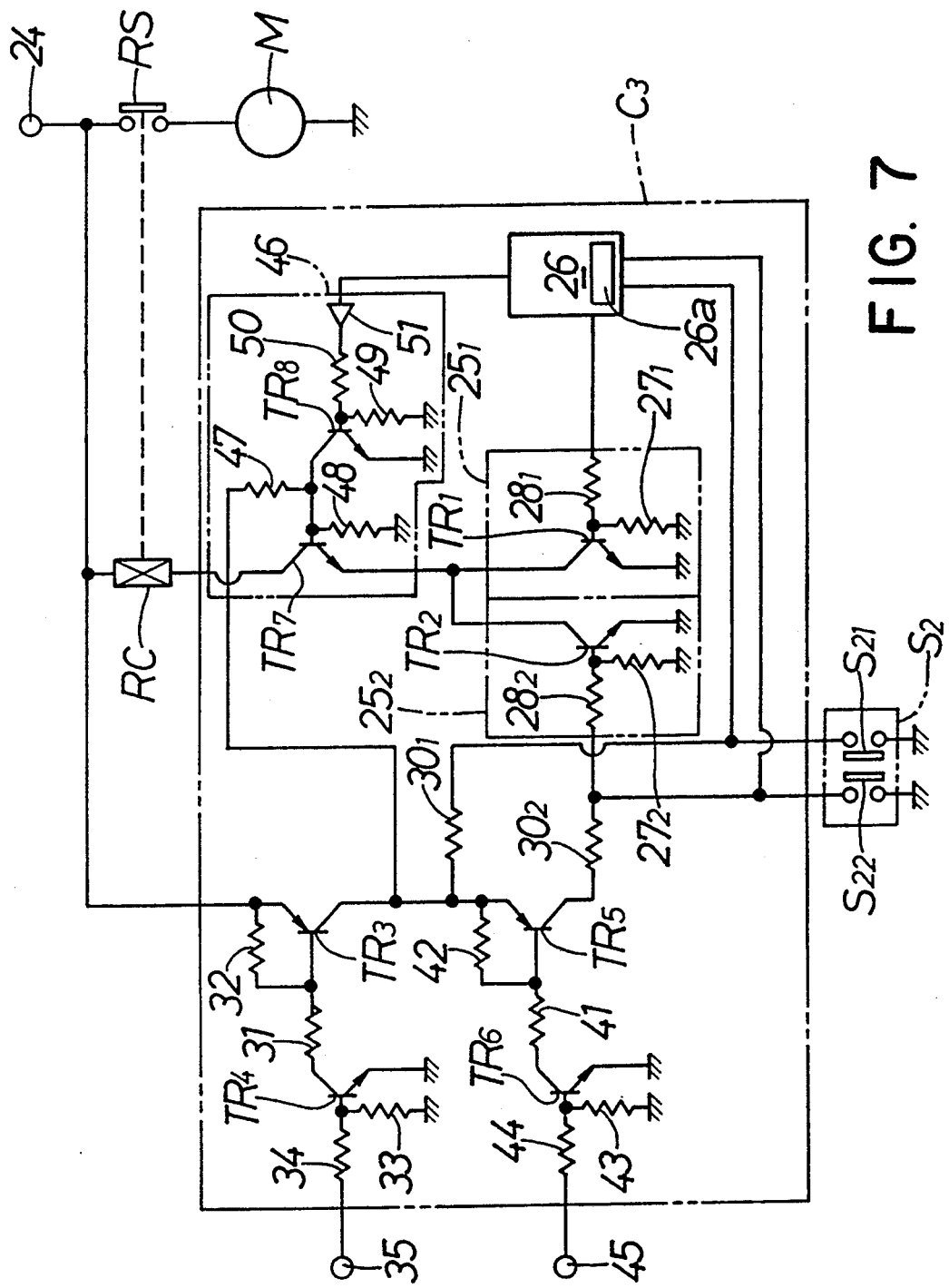
FIG. 7 is a circuit diagram similar to FIG. 2, but illustrating an arrangement of a controller according to a third embodiment of the present invention.

FIG. 7 illustrates a third embodiment of the present invention, wherein components or parts corresponding to those in each of the previous embodiments are designated by like reference characters.

In a controller $C_3$, a resistor $30_1$ is connected in series to a transistor $TR_3$ which conducts in response to a signal applied to an input terminal 35 when the ignition key is ON becoming a high level. A serial circuit comprising a PNP transistor $TR_5$ and a resistor $30_2$ is connected in series to the transistor $TR_3$. A base of the transistor $TR_5$ is grounded through a resistor 41 and an NPN transistor $TR_6$, and the base and emitter of the transistor $TR_5$ are connected to each other through a resistor 42. A base of the transistor $TR_6$ is grounded through a resistor 43 and connected to an input terminal 45 through a resistor 44. A high level signal is applied to the input terminal 45 when the engine mounted in the vehicle is in operation. In response to conduction of the transistor $TR_6$, the transistor $TR_5$ also conducts, when the engine is in operation. The first pressure detector $S_{21}$ is connected to the terminal 24 through a serial circuit comprised of the resistor $30_1$ and the transistor $TR_3$, while the second pressure detector $S_{22}$ is connected to the terminal 24 through a serial circuit comprised of the resistor $30_2$, the transistor $TR_5$ and the transistor $TR_3$. A point between the resistor $30_1$ and the first pressure detector $S_{21}$ is connected to the processing circuit 26, while points between the resistor $30_2$ and the second pressure detector $S_{22}$ are connected to the processing circuit 26 and the second drive signal generating circuit $25_2$, respectively.

An interrupter 46 is interposed between the first and second drive signal generating circuits $25_1$ and $25_2$ and the relay coil RC. The interrupter 46 is intended to deenergize the relay coil RC to stop the operation of the pump P in response to an output signal from the processing circuit 26 irrespective of output signals from the first and second drive signal generating circuits $25_1$ and $25_2$. The interrupter 46 includes an NPN transistor $TR_7$ interposed between the relay coil RC and the drive signal generating circuits $25_1$ and $25_2$, and an NPN transistor $TR_8$ interposed between the transistor $TR_7$ and the earth. A base of the transistor $TR_7$ is connected to the terminal 24 through a resistor 47 and the transistor $TR_3$ and grounded through a resistor 48, while a base of the transistor $TR_8$ is grounded through a resistor 49 and connected to the processing circuit 26 through a resistor 50 and an amplifier circuit 51.

Such interrupter 46 ensures that when the transistor $TR_3$ is in conduction, the transistor $TR_7$ is in conduction, and when the transistor $TR_8$ is cut off, the transistor $TR_7$ is cut off.

According to the third embodiment, in addition to the effect of the previous second embodiment, it is possible to prevent a wasteful consumption of the power of a vehicle battery when the ignition key is OFF, and to cut off the second pressure detector $S_{22}$ from the terminal 24 to prevent a wasteful consumption of the power when the engine is stopped. Moreover, if it is unnecessary to provide a control by the first pressure detector $S_{21}$ when the engine is stopped, then the resistor $30_1$ may be connected in parallel to the transistor $TR_5$ together with the resistor $30_2$, thereby making it possible to further reduce the wasteful consumption of the power.

In addition, the relay coil RC can be energized to stop the operation of the pump P by controlling the interrupter 46 in response to an output signal from the processing circuit 26, irrespective of the output signals from the first and second drive signal generating circuits $25_1$ and $25_2$. Therefore, when there is any trouble, the operation of the pump P can forcedly be stopped.

As a further embodiment of the present invention, of the two pressure detectors $S_{21}$ and $S_{22}$, only the first pressure detector $S_{21}$ may be connected to the processing circuit 26 shown in FIGS. 4 and 7. If so, the pressure in the accumulator AC can be controlled on a high pressure side by controlling the first drive signal generating circuit $25_1$ by the processing circuit 26 on the basis of the detection signal from the first pressure detector $S_{21}$ at ordinary times. If an abnormality is produced in the processing circuit 26, then the second drive signal generating circuit $25_2$ is controlled on the basis of the detection signal from the second pressure detector $S_{22}$, so that a minimum required pressure can be insured in the accumulator AC.

Figure 8:
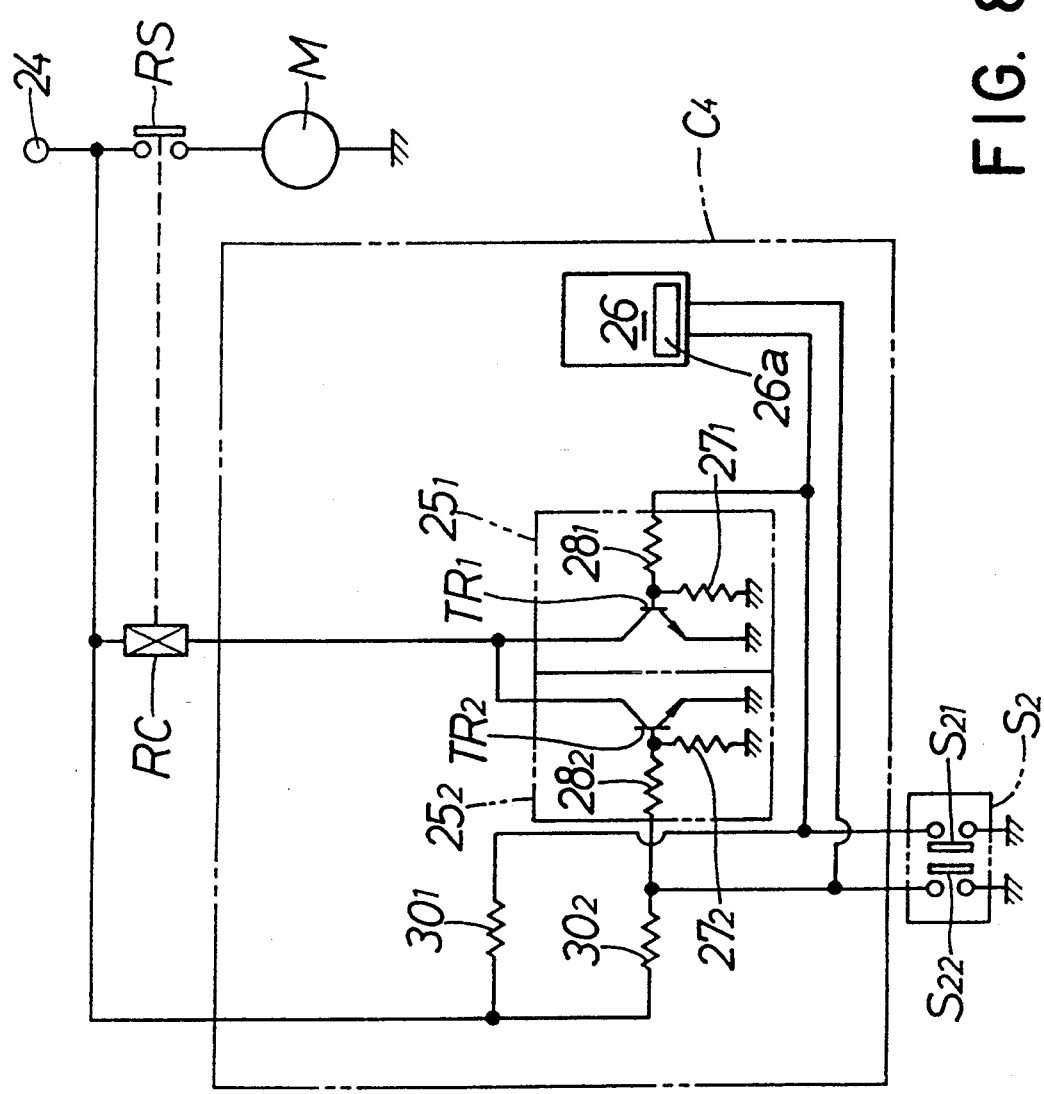
FIG. 8 is a circuit diagram similar to FIG. 2, but illustrating an arrangement of a controller according to a fourth embodiment of the present invention.

FIG. 8 illustrates a fourth embodiment of the present invention, wherein components or parts corresponding to those in each of the previous embodiments are designated by like reference characters.

In a controller $C_4$, a first pressure detector $S_{21}$ is connected to a first drive signal generating circuit $25_1$, while a second pressure detector $S_{22}$ is connected to a second drive signal generating circuit $25_2$. Both the pressure detectors $S_{21}$ and $S_{22}$ are connected to the processing circuit 26.

According to the fourth embodiment, even if the first drive signal generating circuit $25_1$ or the first pressure detector $S_{21}$ falls in trouble, a minimum control pressure required in the adjusting device $2_1$ (see FIG. 1) can be insured by controlling the second drive signal generating circuit $25_2$ on the basis of the output signal from the second pressure detector $S_{22}$.

Figure 9:
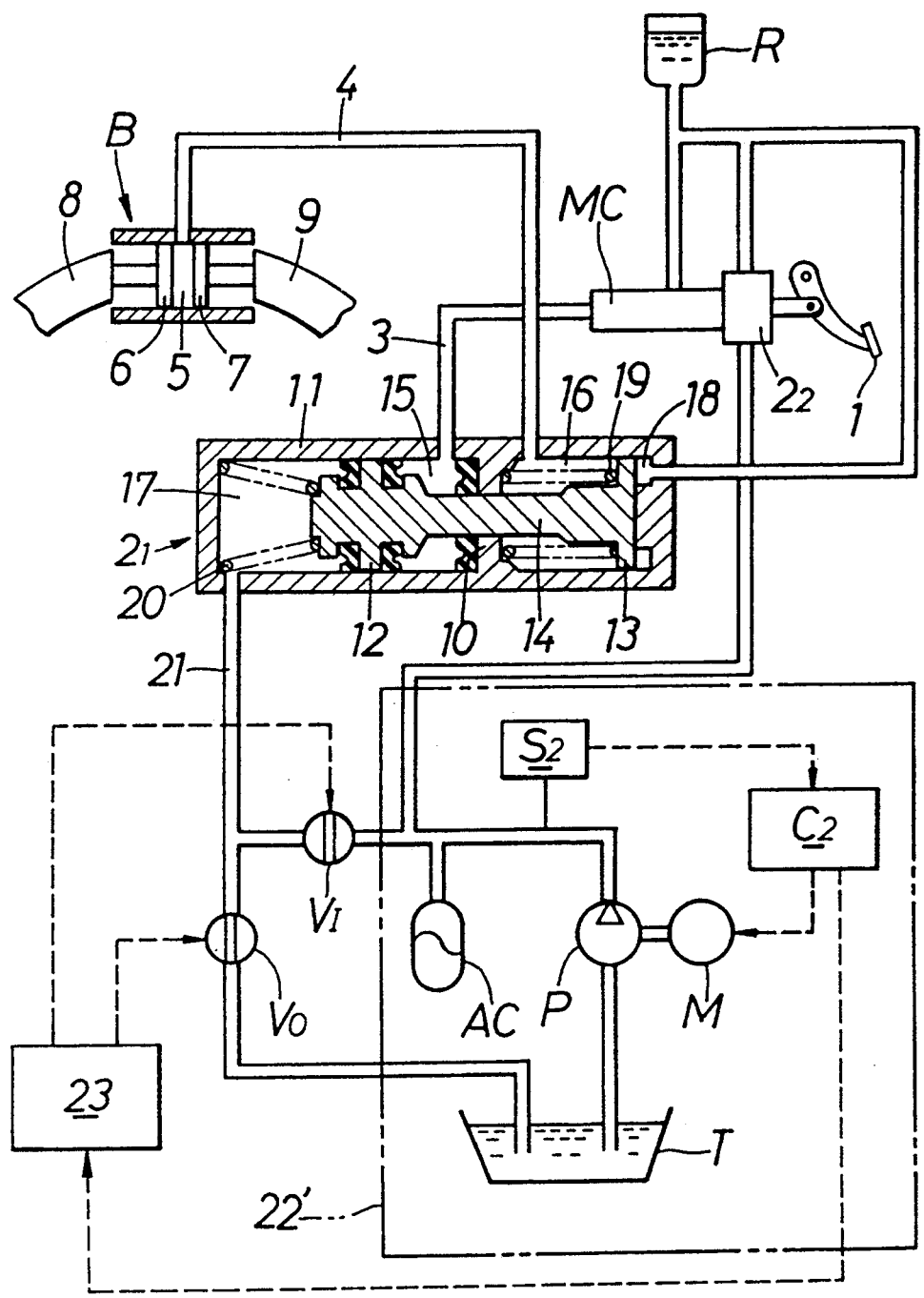
FIG. 9 is a diagram of the entire hydraulic circuit similar to FIG. 1, but illustrating a fifth embodiment of the present invention.

FIG. 9 illustrates a fifth embodiment of the present invention, wherein components or parts corresponding to those in each of the previous embodiments are designated by like reference characters.

The brake pedal 1 is connected to the master cylinder MC through a hydraulic braking pressure boosting device $2_2$ as a pressure device, and an output hydraulic pressure from the master cylinder MC is transmitted to the wheel brake B through the adjusting device $2_1$ as a pressure device.

The hydraulic braking pressure boosting device $2_2$ is of a conventional type connected to a pressure source 22' and is adapted to exhibit hydraulic pressure for operating the master cylinder MC in a boosting manner with a pressure from the pressure source 22' upon depression of the brake pedal 1. In the pressure source 22', a pressure detecting means $S_2$ including first and second pressure detectors $S_{21}$ and $S_{22}$ is connected to an accumulator AC. A motor M connected to a pump P is controlled by the controller $C_2$ shown in FIG. 4, the controller $C_3$ shown in FIG. 7 or the controller $C_4$ shown in FIG. 8. A first low pressure $P_{1L}$ detected by the first pressure detector $S_{21}$ is set at a pressure (e.g., 150 kg/cm$^2$ for a passenger car) permitting the supply of a pressure and a fluid amount required to operate both the hydraulic braking pressure boosting device $2_2$ and the adjusting device $2_1$, and a second low pressure $P_{2L}$ detected by the second pressure detector $S_{22}$ is set at a pressure (e.g., 120 kg/cm$^2$ for a passenger car) permitting the supply of a pressure and a fluid amount required to operate the hydraulic braking pressure boosting device $2_2$.

The controller $C_2$ ($C_3$ or $C_4$) is arranged to provide a deactivating signal to an anti-lock control processing device 23 in order to deactivate the pressure-increasing and decreasing operations of the adjusting device $2_1$, when the second low pressure $P_{2L}$ is detected by the second pressure detector $S_{22}$.

If so, even when the first pressure detector $S_{21}$ or the first drive signal generating circuit $25_2$ is in trouble, a braking force can be reliably provided by controlling the second drive signal generating circuit $25_2$ by the second pressure detector $S_{22}$ to insure the operation of the hydraulic braking pressure boosting device $2_2$.

In a further embodiment of the present invention, the adjusting device $2_1$ shown in FIG. 8 may be replaced by a direct control type adjusting device in which a normally-opened type solenoid valve controlled for opening and closing by the anti-lock control processing device 23 is interposed between the master cylinder MC and the wheel brake B, and an oil passage 21 is connected between the normally-opened type solenoid valve and the wheel brake B. In addition, a traction control processing device may be provided to control the opening and closing of three solenoid valves.

Although the pressure switch is used as the pressure detector $S_1$, $S_{21}$, $S_{22}$ in each of the above-described embodiments, a pressure sensor for detecting the pressure in the accumulator AC may be used.

While the invention has been particularly shown and described in reference to preferred embodiments thereof, it will be understood by those skilled in the art that changes in form and details may be made therein without departing from the spirit and scope of the invention.

What is claimed is:

1. A pressure source for a pressure device, comprising:
   a pump for pumping fluid,
   a pressure tank connected to said pump and to a pressure device,
   a pressure detecting means for detecting the fluid pressure in said pressure tank, and
   a controller for controlling the operation of said pump in an ON-OFF manner on the basis of a result of detection by said pressure detecting means, wherein
   said controller includes first and second drive signal generating circuits each capable of independently generating a drive signal for determining the ON- OFF operation of said pump, and a judging circuit which is connected to at least said pressure detecting means, said judging circuit judges whether the pump is required to be driven or not and to determine a time duration in which the pump is driven based on a condition of said pressure detecting means, said judging circuit being connected to said first drive signal generating circuit, and said pressure detecting means being connected to said second drive signal generating circuit.

2. A pressure source for a pressure device according to claim 1, wherein said pressure detecting means comprises a first pressure detector capable of detecting a first low pressure and a first high pressure higher than the first low pressure, and a second pressure detector capable of detecting a second low pressure lower than the first low pressure and a second high pressure higher than the second low pressure, said first pressure detector being connected to said judging circuit, signal generating circuit.

3. A pressure source for a pressure device according to claim 2, wherein said pressure device is mounted in a vehicle and is operated with a pressure energy which is required to be larger as a vehicle speed is increased, and said judging circuit stops the generation of a drive signal from said first drive signal generating circuit after lapse of a predetermined time from the detection of said first high pressure by said first pressure detector, said predetermined time being set such that it is prolonged as the vehicle speed is increased.

4. A pressure source for a pressure device according to claim 2, wherein said pressure device comprises a hydraulic braking pressure boosting device for a vehicle for boosting the hydraulic pressure force applied to a wheel brake in accordance with the quantity of operation of a brake pedal, and an adjusting device capable of controlling said hydraulic pressure force to increase or decrease, said first low pressure being set at a pressure at which all the functions of said hydraulic braking pressure boosting device and said adjusting device can be insured, said second low pressure being set at a pressure at which the function of said hydraulic braking pressure boosting device can be insured, and said controller is arranged to produce a signal indicative of a command to deactivate said adjusting device, when said second low pressure is detected.

5. A pressure source for a pressure device according to claim 1, wherein said pressure detecting means comprises a first pressure detector capable of detecting a first low pressure and a first high pressure higher than the first low pressure, and a second pressure detector capable of detecting a second low pressure lower than the first low pressure and a second high pressure higher than the second low pressure, said first and second pressure detectors being connected to said judging circuit, and said second pressure detector being connected to the second drive signal generating circuit.

6. A pressure source for a pressure device according to claim 5, wherein said controller includes an interrupter for stopping the operation of said pump in response to an output signal from said judging circuit, irrespective of output signals from said first and second drive signal generating circuits.

7. A pressure source for a pressure device according to claim 5, wherein said judging circuit includes a trouble deciding section for both the pressure detectors and is arranged to control the first drive signal generating circuit on the basis of a detection value provided by said first pressure detector when it is judged that said first pressure detector is normal, and to control the first drive signal generating circuit on the basis of a detection value provided by said second pressure detector when it is judged that said first pressure detector is abnormal.

8. A pressure source for a pressure device, comprising:
a pump for pumping fluid,
an electric motor for driving the pump,
a pressure tank connected to said pump and to a pressure device,
a relay coil and a relay switch for controlling power supply to the electric motor in an ON-OFF manner,
a pressure detecting means for detecting the fluid pressure in said pressure tank and capable of outputting an electrical signal which is variable dependent on a change in said fluid pressure, and
a controller for controlling the operation of said pump in an ON-OFF manner on the basis of a result of detection by said pressure detecting means,
wherein said pressure detecting means comprises a first pressure detector capable of detecting a first low pressure and a first high pressure higher than said first low pressure, and a second pressure detector capable of detecting a second low pressure lower than said first low pressure and a second high pressure higher than said second low pressure, and said controller includes first and second drive signal generating circuits each capable of independently generating a drive signal for determining the ON-OFF operation of the pump, said first pressure detector being connected to said first drive signal generating circuit, and said second pressure detector being connected to said second drive signal generating circuit, said first and second drive signal generating circuits being connected to said relay coil in parallel to each other, and wherein control means is provided for controlling the operation of said first drive signal generating circuit based on signals from said first and second pressure detectors, said second pressure detector feeding its signal to the second drive signal generating circuit independently of the control by said control means.

9. A pressure source for a pressure device according to claim 8, wherein said pressure device comprises a hydraulic braking pressure boosting device for a vehicle for boosting the hydraulic pressure force applied to a wheel brake in accordance with the quantity of operation of a brake pedal, and an adjusting device capable of controlling said hydraulic pressure force to increase or decrease, said first low pressure being set at a pressure at which all the functions of said hydraulic braking pressure boosting device and said adjusting device can be insured, said second low pressure being set at a pressure at which the function of said hydraulic braking pressure boosting device can be insured, and said controller is arranged to produce a signal indicative of a command to deactivate said adjusting device when said second low pressure is detected.

10. A pressure source for a pressure device, comprising:
a pump for pumping fluid;
a pressure tank connected to said pump and to a pressure device;
a pressure detecting means for detecting the fluid pressure in said pressure tank and capable of outputting an electrical signal which is variable dependent on a change in said fluid pressure; and a controller for controlling the operation of said pump in an ON-OFF manner on the basis of a result of detection by said pressure detecting means, wherein said controller includes first and second drive signal generating circuits each capable of independently generating a drive signal for determining the ON-OFF operation of said pump, and a judging circuit which is connected to at least said pressure detecting means, said judging circuit judges whether the pump is required to be driven or not and to determine a time duration in which the pump is driven, said judging circuit being connected to said first drive signal generating circuit and controlling the operation of the first drive signal generating circuit based at least on the signal from said pressure detecting means, and said pressure detecting means being connected to said second drive signal generating circuit and feeding its signal to the second drive signal generating circuit independently of the control by said judging circuit.

* * * * *